US012706911B2

(12) United States Patent
Reina

(10) Patent No.: US 12,706,911 B2
(45) Date of Patent: Aug. 11, 2026

(54) SECURE COLLECTION OF DIAGNOSTICS DATA ABOUT INTEGRATED CIRCUIT MEMORY CELLS

(71) Applicant: Micron Technology, Inc., Boise, ID (US)

(72) Inventor: Vincenzo Reina, Munich (DE)

(73) Assignee: Micron Technology, Inc., Boise, ID (US)

( * ) Notice: Subject to any disclaimer, the term of this patent is extended or adjusted under 35 U.S.C. 154(b) by 209 days.

(21) Appl. No.: 17/846,767

(22) Filed: Jun. 22, 2022

(65) Prior Publication Data

US 2023/0057004 A1 Feb. 23, 2023

Related U.S. Application Data

(60) Provisional application No. 63/233,839, filed on Aug. 17, 2021.

(51) Int. Cl.

| | |
|---|---|
| ***H04L 9/40*** | (2022.01) |
| ***G06F 21/60*** | (2013.01) |
| ***G06F 21/78*** | (2013.01) |
| ***H04L 9/06*** | (2006.01) |
| ***H04L 9/08*** | (2006.01) |
| ***H04L 9/32*** | (2006.01) |

(52) U.S. Cl.

CPC ............ *H04L 63/10* (2013.01); *G06F 21/602* (2013.01); *G06F 21/78* (2013.01); *H04L 9/0618* (2013.01); *H04L 9/0866* (2013.01); *H04L 9/32* (2013.01); *H04L 63/1425* (2013.01); *H04L 63/0428* (2013.01)

(58) Field of Classification Search

CPC ... H04L 9/0861; H04L 9/0866; H04L 9/0618; H04L 9/32; H04L 9/3278; H04L 63/10; H04L 63/1425; H04L 63/0428; H04L 63/04; G06F 21/602; G06F 21/70; G06F 21/78; G06F 21/79

See application file for complete search history.

(56) References Cited

U.S. PATENT DOCUMENTS

| | | | | |
|---|---|---|---|---|
| 9,535,779 | B1 * | 1/2017 | Ma | G06F 11/0727 |
| 9,965,347 | B1 * | 5/2018 | Klett | G06F 11/0787 |
| 2011/0119486 | A1 * | 5/2011 | Boldyrev | H04L 63/10 726/4 |
| 2012/0023334 | A1 * | 1/2012 | Brickell | H04L 9/3273 713/169 |
| 2015/0358218 | A1 * | 12/2015 | Nasir | H04L 41/0803 709/224 |
| 2016/0344731 | A1 * | 11/2016 | Serebrin | H04L 9/3247 |

(Continued)

*Primary Examiner* — Jeremy S Duffield
(74) *Attorney, Agent, or Firm* — Greenberg Traurig

(57) ABSTRACT

Systems, apparatuses, and methods to secure remote collection of memory diagnostics data generated during operations of memory cells configured in a memory device connected to a host system. The diagnostics data is stored in a secure memory region within the memory device, which controls access to the secure memory region based on cryptography. After a communication connection is established, via the host system and between the memory device and a security server having a privilege to access the secure memory region, the diagnostics data can be transmitted from the memory device to the security server in an encrypted form over the communication connection.

17 Claims, 7 Drawing Sheets

(56) References Cited

U.S. PATENT DOCUMENTS

| | | | | |
|---|---|---|---|---|
| 2017/0131947 | A1* | 5/2017 | Hoang | G06F 11/3034 |
| 2017/0257217 | A1* | 9/2017 | Davis | H04L 63/08 |
| 2020/0186342 | A1* | 6/2020 | Zhang | H04L 9/0872 |
| 2020/0202017 | A1* | 6/2020 | Parry | H04L 9/302 |
| 2020/0210596 | A1* | 7/2020 | Cariello | G06F 21/79 |
| 2020/0233967 | A1* | 7/2020 | Mondello | G06F 21/64 |
| 2020/0322134 | A1* | 10/2020 | Duval | H04L 9/083 |
| 2020/0371878 | A1* | 11/2020 | Chaiken | G06F 9/4401 |
| 2020/0389791 | A1* | 12/2020 | Takemori | H04L 9/08 |
| 2021/0329005 | A1* | 10/2021 | Locke | H04L 63/1475 |

* cited by examiner

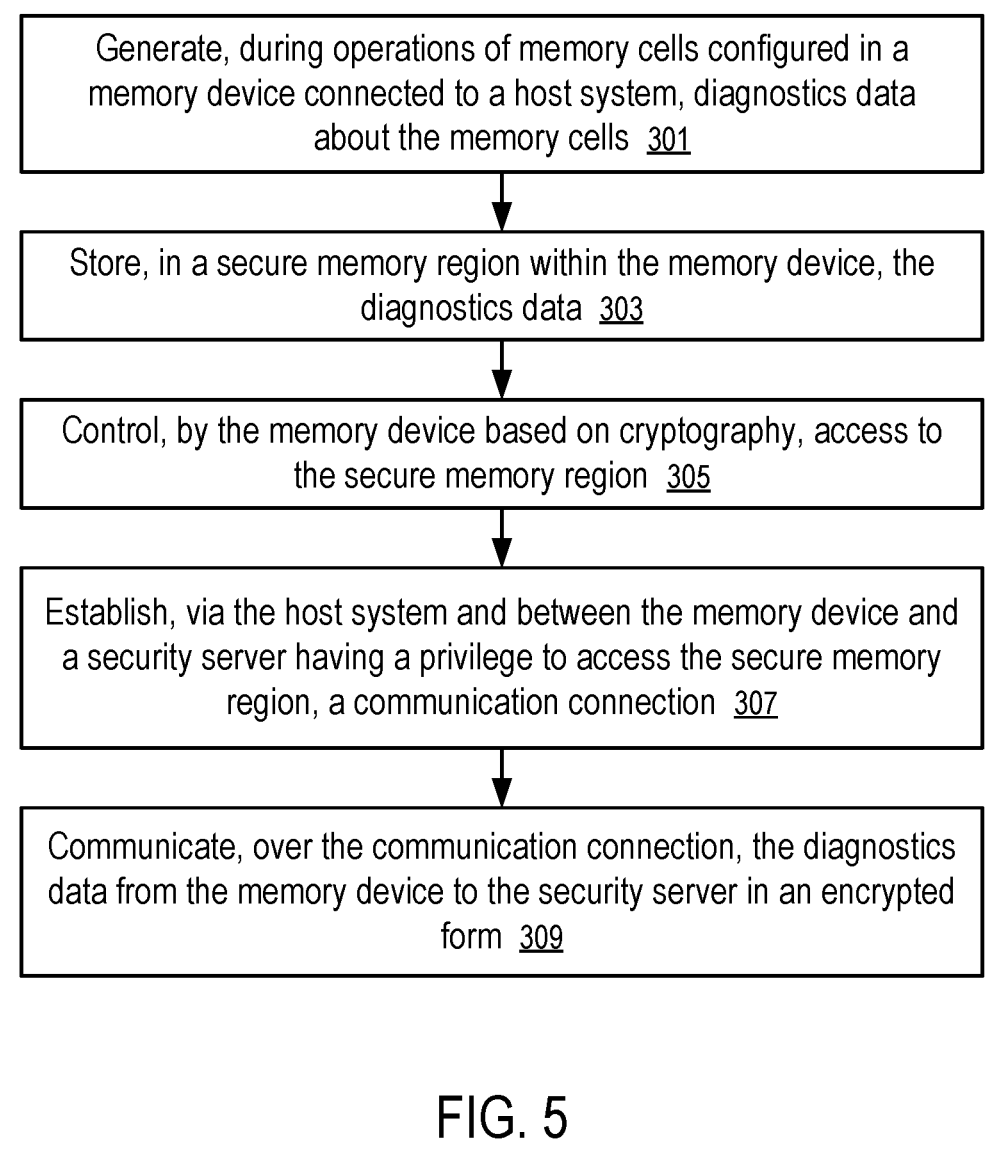

Generate, during operations of memory cells configured in a memory device connected to a host system, diagnostics data about the memory cells 301

Store, in a secure memory region within the memory device, the diagnostics data 303

Control, by the memory device based on cryptography, access to the secure memory region 305

Establish, via the host system and between the memory device and a security server having a privilege to access the secure memory region, a communication connection 307

Communicate, over the communication connection, the diagnostics data from the memory device to the security server in an encrypted form 309

FIG. 5

SECURE COLLECTION OF DIAGNOSTICS DATA ABOUT INTEGRATED CIRCUIT MEMORY CELLS

RELATED APPLICATIONS

The present application claims priority to Prov. U.S. Pat. App. Ser. No. 63/233,839 filed Aug. 17, 2021, the entire disclosures of which application are hereby incorporated herein by reference.

TECHNICAL FIELD

At least some embodiments disclosed herein relate to access control in general, and more particularly, but not limited to controlling access to diagnostics data about integrated circuit memory cells in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 5 shows a method to secure collection of memory diagnostics data according to one embodiment.

DETAILED DESCRIPTION

Figure 1:
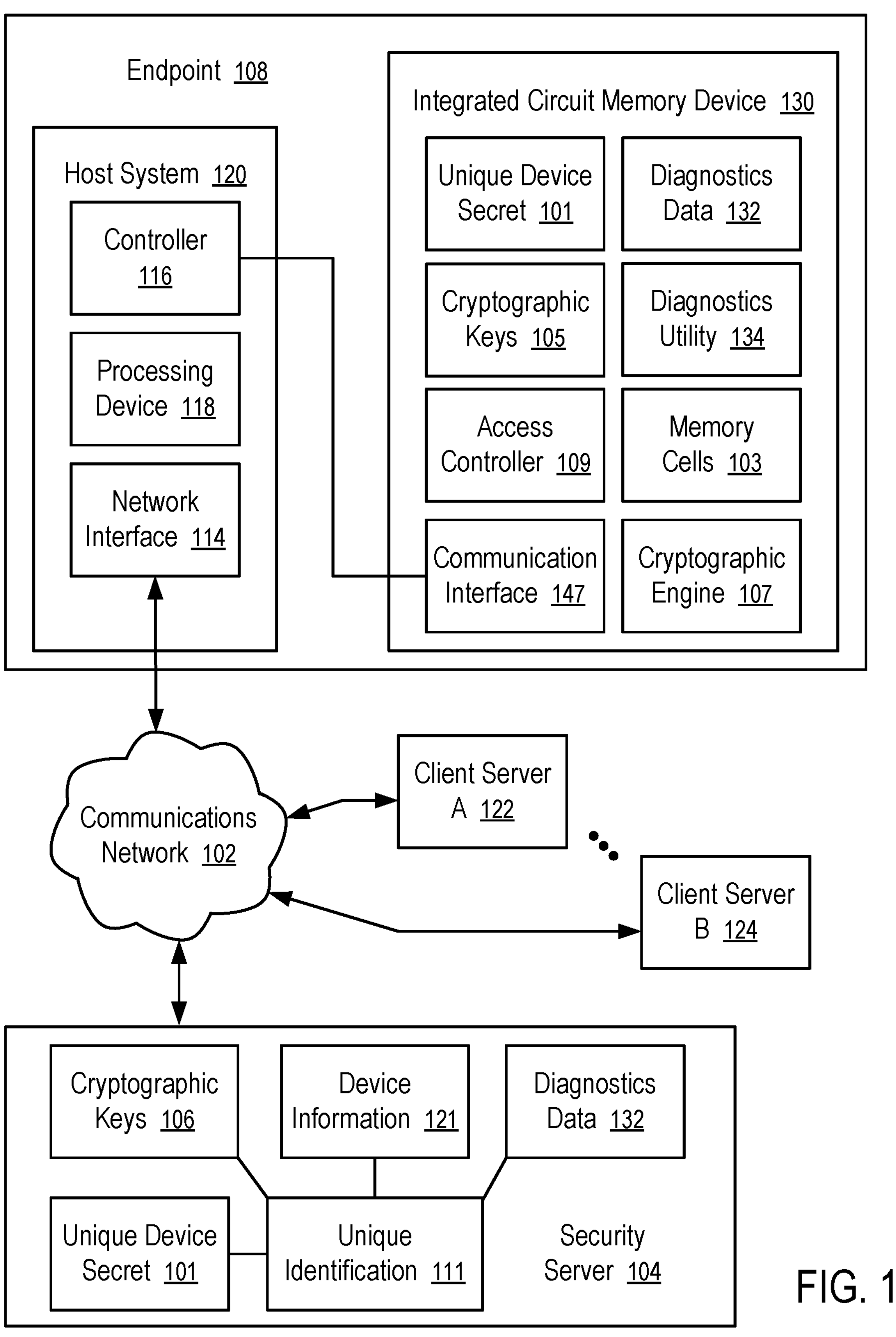
FIG. 1 illustrates an example computing system to secure collection of diagnostics data about integrated circuit memory cells in accordance with one embodiment.

At least some aspects of the present disclosure are directed to the secure storage and transfer of memory diagnostics data.

A memory sub-system can have a controller, processing device, microprocessor, or logic circuit that manages the operations within the memory sub-system in servicing data access requests received from a host system. During the operations, diagnostics data can be generated to indicate the health, usage, and operation status of the memory cells in the memory sub-system.

In some instances, the diagnostics data can be used to generate a warning message to the host system about a possible failure. The warning message provides the host system with an opportunity to take actions to prevent or reduce impacts that may result from such a failure. For example, the diagnostics data can include at least a portion of data collected and/or reported via Self-Monitoring, Analysis and Reporting Technology (SMART) in computer hard disk drives (HDDs), solid-state drives (SSDs), embedded Multi Media Card (eMMC) drives, Universal Flash Storage (UFS), etc.

The diagnostics data in the memory sub-system can include further data useful for the manufacturer of memory sub-systems and/or memory devices in investigating failures, reviving failed memory sub-systems, recovering at least portions of user data stored in failed memory sub-system, etc. Such diagnostics data is typically stored in a section inaccessible to a host system connected in a standard way to the memory sub-system or memory device; and after failed memory sub-systems and/or memory devices are transported to a facility of the manufacturer, a special-purpose tool and/or procedure can be used to access such diagnostics data inaccessible to typical systems in which the memory sub-systems and/or memory devices are use.

However, the need to transport the memory sub-systems and/or memory devices to the facility of the manufacturer to access the diagnostics data can limit the usages of the diagnostics data in discovering problems and preventing certain failures.

At least some aspects of the present disclosure address the above and other deficiencies and/or challenges by techniques to secure storage and access diagnostics data to enable remote access. Using the diagnostics data accessed remotely via a security server, potential problems can be discovered early such that corrective measures can be taken to address the problems before premature failures. For example, the diagnostics data can be monitored to detect unusual data access patterns in memory sub-systems that can be indicative a software design flaw in the host systems that use the memory sub-systems. When the design flaw causes excessive writes to a memory sub-system, the useful life of the memory sub-system can be reduced dramatically. When the design flaw is discovered from the monitoring of the diagnostics data, the software design flaw can be corrected before the revealing of the flaw from premature failures of the memory sub-systems in products.

For example, a memory device can be configured with a security manager that controls access to a secure memory region via cryptography. Diagnostics data about memory cells in the memory device can be generated during the operations of the memory device and stored in the secure memory region. Access requests to the secure memory region can require digital signatures generated using a cryptographic key. A security server can have the cryptographic key to access the diagnostics data. A diagnostics utility can be configured at least in part as instructions executable in a host system of the memory device. When the diagnostics utility is executed in the host system, the diagnostics utility can facilitate the establishment of a secure authenticated communication connection between the memory device and the security server. Through the connection the security server can remotely retrieve the diagnostics data from the memory device to monitor the health of the memory device and discover potential problems in the memory device and/or in the usage of the memory device.

For example, the host system can be configured to periodically prompt the user of the host system to run the diagnostics utility to provide the diagnostics data to the security server. Alternatively, the host system can be configured to prompt the user to provide the permission to periodically run the diagnostics utility (e.g., once a week, a month, a quarter, or a year) to provide the diagnostics data. The diagnostics data can be configured to exclude data stored by the host system into the memory device to protect the data of the user.

The periodic collection of diagnostics data in an automated way by a security server can be used to enable detection of potential issues within memory sub-systems and/or computing systems that use the memory sub-systems.

For example, a product (e.g., a car, an Internet of Thing (IoT) device) can use a memory sub-system to store data used by the product. When the software of the product causes excessive writes in the memory sub-system, the manufacturer of the product may not notice the problem until many units of the product fail prematurely during normal services. The delay in the discovery of the problem can lead to a costly recall action, hardware repair or replacement, service interruption, etc.

By monitoring the diagnostics data, the security server can discover the anomalous increase in erase cycles and thus the accelerated rate of consuming the useful lifetime of a memory sub-system. Such an observation predicts a shortened service life of the product. Based on the prediction, the security server and/or the manufacturer of the memory sub-system/device can generate an alert for the manufacturer of the product to investigate the issue and take early actions (e.g., over the air update) to limit damage and interruption.

Various types of diagnostics data can be collected into the security server to monitor the health of the memory cells in a memory sub-system or a memory device. For example, the diagnostics data can include a count of erasure operations performed in a block or a region of memory cells.

For example, the diagnostics data can include statistics on thermal usage conditions, such as maximum and minimum temperatures of operation experienced by the memory cells, histograms of usage temperature profiles, etc.

For example, the diagnostics data can include statistics on typical data access modes (e.g., sequential vs. random), chunk size, data access type (e.g., write vs. read), etc.

For example, the diagnostics data can include details on memory cell error recovery, frequency of read retry and soft data read usage, bad block development, etc.

For example, the diagnostics data can include information about power supply to the memory cells, such as time duration of power on, statistics on power cut/off events, a count of power cycles, etc.

For example, the diagnostics data can include error log and/or diagnostic data on the controller.

In addition to provide a standardized health status report to a host system (e.g., via a SMART report), a secure mechanism can be used to facilitate the remote reporting of vendor specific health status report of memory sub-systems and/or memory devices (e.g., via the Internet) to their vendors or manufacturers. The vendors or manufacturers can analyze the health status reports specific to their memory sub-systems and/or memory devices and/or use knowledge and/or tools specific to their memory sub-systems and/or memory devices to detect issues early in the lifecycle of the products that use the memory sub-systems and/or memory devices For example, during the manufacturing of a memory device, a secret specific to the memory device can be configured in the memory device and registered in a security server for the memory device. The security server can include a key management server that has improved security for storage and usage of cryptographic keys; and a copy of the secret of the memory device can be secured in the key management server. When the memory device is assembled into an endpoint (e.g., a host system, a computing apparatus, a product) designed to be used by an end user, information or identification about the endpoint can be optionally stored into the memory device to form the identity of the endpoint and/or the memory device. The secret can be used to authenticate the identity of the endpoint and/or the memory device in establishing a connection to the security server. When the diagnostics data and/or the health status report is transmitted to the security server via a computer network (e.g., the Internet), the data and/or report can be transmitted in an encrypted form protected via the secret key of the memory device. The data and/or report can identify the memory device and/or the manufacturer of the endpoint in which the memory device is configured.

A diagnostics utility can run in the endpoint to facilitate the transmission of the diagnostics data and/or the health status report from a secure section of the memory device to the security server. Alternatively, the manufacturer of the endpoint can operate a server to retrieve the diagnostics data and/or the health status report and provide the data and/or report to the manufacturer of the memory device for analyses.

In some instances, the endpoint (e.g., a vehicle) may not have access to computer networks (e.g., the Internet) during normal usage. The diagnostics utility can run when the endpoint is in an authorized service facility (e.g., mechanics) to transmit the diagnostics data via the service facility in an encrypted format to a server. Since the service facility and/or the host system can facilitate the communication without the decryption key, the service facility and/or the host system can be configured with no access to the content of the diagnostics data and/or the health status report.

Optionally, the security server can provide a platform to share the collected the diagnostics data and/or health status reports with authorized partners, such manufacturers of products and endpoints that use the corresponding memory sub-systems and/or memory devices.

Examples of storage devices and memory modules as memory sub-systems are described below in conjunction with FIG. 6. In general, a host system can utilize a memory sub-system that includes one or more components, such as memory devices that store data. The host system can provide data to be stored at the memory sub-system and can request data to be retrieved from the memory sub-system.

Diagnostics data of memory cells can be stored and secured in a secure memory device that uses cryptography to establish identity, and/or control access.

For example, the secure memory device can store an unique device secret representative of the memory device. A cryptographic key can be generated based at least in part on the unique device secret. A digital signature generated using the cryptographic key can be used to demonstrate the identity of the memory device represented at least in part by the unique device secret, as further discussed below in connection with FIG. 3.

For example, the secure memory device can require a command to be signed using a cryptographic key before the command is executed to access a secure memory region. The cryptographic key is representative of the privilege to access the secure memory region. Thus, without the cryptographic key, an application or entity cannot access the secure memory region, as further discussed below in connection with FIG. 4.

FIG. 1 illustrates an example computing system to secure collection of diagnostics data about integrated circuit memory cells in accordance with one embodiment.

In FIG. 1, an integrated circuit memory device 130 has security features in establishing unique identity and in controlling access.

The secure memory device 130 can store a unique device secret 101 for its authentication. In one example, the unique device secret 101 is injected into the memory device 130 in a secure facility and stored in a register of the memory device 130. In another example, the unique device secret 101 can be obtained from a physical unclonable function (PUF) of the memory device 130. The unique device secret 101 can be obtained and registered in the security server 104 via the secure facility. For example, the secure facility can be part of a manufacturing facilities of memory devices (e.g., 130). After the memory device 130 is manufactured and/or leaves the secure facility, the unique device secret 101 in the memory device 130 is not accessible via any interface (e.g., communication interface 147) to the memory device 130. Thus, after the manufacture of the memory device 130, the unique device secret 101 as in the memory device 130 is sealed in the integrated circuit package of the memory device 130. A copy of the unique device secret 101 is secured within the security server 104 with strong security measures (e.g., use of hardware security module (HSM)) to prevent hacking and unauthorized access.

The memory device 130 includes a logic circuit or local controller that implements a cryptographic engine 107. The cryptographic engine 107 can perform cryptographic computations, such as hashing, key derivation, encrypting, and/or decrypting, without relying upon the processing power outside of the memory device 130, such as a processing device 118 of a host system 120.

For example, according to a method specified by standards for Device Identity Composition Engine (DICE) and Robust Internet-of-Things (RIoT), or another method, cryptographic keys 105 can be generated, at boot time, based on a combination of the unique device secret 101 and device information 121 stored and/or obtained in the memory cells 103 of the memory device 130. The device information 121 can include non-secret data that may be obtained by the entity outside of the security server 104 and the memory device 130. For improved security, the device information 121 can include time related information.

For example, the cryptographic keys 105 can include two pairs of asymmetric cryptographic keys. A first pair of asymmetric keys is referred to as device identification keys; and a second pair of asymmetric keys is referred to as alias keys. The private device identification key is used to certify the authenticity of the alias keys and thus reduces its uses and exposure to risks. The alias keys can be used in more transactions/communications; and the alias keys can be replaced more frequently than the device identification keys to improve security in view of their more frequent uses and thus exposure to risks. For example, the private device identification key can be generated at a boot time and used to sign certificates, such as a certificate of the alias public key; and then the private device identification key is immediately deleted from the memory device 130 to safeguard its secrecy.

In general, one of the cryptographic keys 105 generated using the unique device secret 101 and the device information 121 can be used as a secret and an identity of the memory device 130 to be validated by the security server 104.

For example, authentication of the memory device 130 can be performed through the verification that the memory device 130 has the secret cryptographic key 105. Having the secret cryptographic key 105 in the memory device 130 can be considered an evidence that the memory device 130 has the unique device secret 101 and stores an untampered version of non-secret data.

Using the cryptographic engine 107, the memory device 130 can demonstrate that the memory device 130 has the secret cryptographic key 105 without communicating the secret cryptographic key 105 and/or the unique device secret 101 to outside of the memory device 130. For example, the memory device 130 can digitally sign a certificate or message using the secret cryptographic key 105 to provide a verification code of the message and the secret cryptographic key 105. When the security server 104 is successful in validating the verification code, the security server 104 can conclude that the memory device 130 has the secret cryptographic key 105 and thus the identity represented by the unique device secret 101.

The memory device 130 includes a communication interface 147 that can be used to receive commands from a host system 120. A controller 116 of the host system can send commands to the memory device 130 to request reading data from the memory cells 103, to write data into the memory cells 103, to erase data from a portion of the memory cells 103, to modify data in a portion of the memory cells 103, to activate a security feature of the memory device 130, to configure parameters relevant to a security feature in the memory device 130, etc. At least some of the commands requires privileges represented by a cryptographic key 106 stored in the security server 104. Having the cryptographic key 106 available to sign the command is considered an indication of having the privilege to request the memory device 130 to execute the command.

The memory device 130 includes an access controller 109 configured to use the cryptographic engine 107 to validate a verification code generated using a cryptographic key 106 representing the privilege associated with the command. If a command is received with a valid verification code, the access controller 109 allows the memory device 130 to execute the command; otherwise, the command can be rejected, ignored, or discarded.

When the memory device 130 is manufactured, one or more relevant cryptographic keys 105 are stored in the memory device 130 to provide the owner privileges to the security server 104. Using the owner privileges, the security server 104 can sign commands for execution in the memory device 130 to activate or inactivate security features, to trigger the replacement of a secret cryptographic key as the identity of the memory device 130, to replace a cryptographic key used by the access controller 109 in verify privileges to have one or more commands executed in the memory device 130 for one or more regions of the memory cells 103, etc.

Optionally, after authenticating the identity of an authorized requester, the security server 104 can sign a command using a cryptographic key to generate a verification code or digital signature for the command such that the requester can send the command with the verification code to the communication interface 147 of the memory device 130 to cause the command to be executed within the memory device 130.

Optionally, the security server 104 can provide certain privileges to an entity by replacing a cryptographic key 105 in the memory device 130, or to provide a corresponding cryptographic key 106 representative of the privileges to the entity.

Typically, the memory device 130 is connected to a host system 120 to form an endpoint 108 in a communications network 102, such as the Internet. In general, the endpoint 108 is a computing device. Examples of the endpoint 108 include a personal computer, a mobile computer, a personal media player, a tablet computer, a smartphone, a smart TV, a smart speaker, a smart appliance, an IoT (Internet of Things) device, etc.

The memory cells 103 of the memory device 130 can provide the storage/memory capacity for the host system 120 to store instructions and data for the implementation of the functionality of the endpoint 108. For example, the processing device 118 of the host system 120 is configured to execute instructions loaded from the memory device 130 to boot up and perform operations.

The host system 120 can include a network interface 114, or another communication device, to communicate with one or more of client servers 122, . . . , 124 to receive services from the client servers 122, . . . , 124, such as a server of the manufacturer of the endpoint 108.

A request for services sent from the endpoint 108 to a client server 122 can include identity data generated by the cryptographic engine 107 of the memory device 130. The client server 122 can request the security server 104 to validate the verification code included in the identity data.

In addition to the services of authenticating the identity of the memory device 130, the security server 104 can offer the service of collecting and/or monitoring the diagnostics data 132 stored in the memory device 130.

For example, the memory device 130 can include a diagnostics utility 134 that stores the diagnostics data 132 about the memory cells 103 in the memory device 130. Further, the diagnostics utility, or a portion of it, can be executed in the processing device 118 of the host system 120 of the endpoint 108 to facilitate the secure transmission of the diagnostics data 132 to the security server 104.

The diagnostics utility 134 can be provisioned at least in part by a manufacturer of the endpoint 108. Thus, when the diagnostics utility 134 is running, the diagnostics utility 134 can visit a server (e.g., 122 or 124) of the manufacturer of the endpoint 108. The diagnostics utility 134 can provide status and/or health information about the endpoint 108 to the server (e.g., 122 or 124). Further, with the consent from the user of the endpoint 108, the diagnostics utility 134 can provide the diagnostics data 132 about the memory cells 103 to the security server 104 that has the cryptographic keys 106 to access and/or control the operations of the memory device 130. Optionally, with the consent from the user of the endpoint 108, the diagnostics utility 134, or a portion of it, can be configured to communicate with the security server 104 directly (e.g., without going through the server of the manufacturer of the endpoint 108) to provide the diagnostics data 132; and the security server 104 can optionally provide a platform to provide data and/or service related to the diagnostics data 132 to relevant entities, such as the manufacturer of the endpoint 108.

The memory device 130 and/or the endpoint 108 can have a unique identification 111 that is not a secret. The unique identification 111 can be used to uniquely identify the memory device 130 and/or the endpoint 108 from a population of memory devices and/or endpoints.

For example, the unique identification 111 of the memory device 130 can include a manufacturer part number (MPN) of the memory device 130 and/or a serial number of the memory device 130. For example, the unique identification 111 of the memory device 130 can include a public key in a pair of asymmetric cryptographic keys generated based at least in part on the unique device secret.

To authenticate that the memory device 130 and/or the endpoint 108 has the identity represented by the unique identification 111, the security server 104 validates a message containing the unique identification 111 (and other data 127) via a verification code of the message signed using a secret cryptographic key 105 of the memory device. The secret cryptographic key 105 in the memory device 130 is generated using the unique device secret 101 in the memory device; and the corresponding cryptographic key 106 used to valid a verification code signed using the secret cryptographic key 105 of the memory device 130 is generated in the security server 104 from the corresponding unique device secret 101.

The secret cryptographic key 105 of the memory device 130 used to demonstrate the identity of the memory device 130 can be generated based on not only the unique device secret 101, but also device information 121 accessible to the memory device 130.

For example, the device information 121 can include a hash value of instructions and/or data stored in the memory cells 103. Further, the device information 121 can include trace data stored into the memory cells 103 to personalize/individualize the memory device 130 and/or the endpoint 108 during the assembling of components to build the endpoint 108. Further, the device information 121 can include identification information of other components in the endpoint 108, such as an identification of the controller 116, an identification of the processing device 118, an identification of the network interface 114, an identification of additional software or data package of the endpoint 108 that is not stored in the memory device 130. During the boot time, the identification data can be collected as the device information 121 that is used to generate the secret cryptographic key 105 of the memory device 130.

In a registration process when the memory device 130 is configured to have the device information 121, a copy of the device information 121 is uploaded to the security server 104 for association with the unique identification 111 of the memory device 130 and/or the endpoint 108. The registration of the device information 121 allows the identity of the memory device 130 to be linked to the data, software and/or hardware configuration represented by the combination of the unique device secret 101 with the device information 121.

Figure 2:
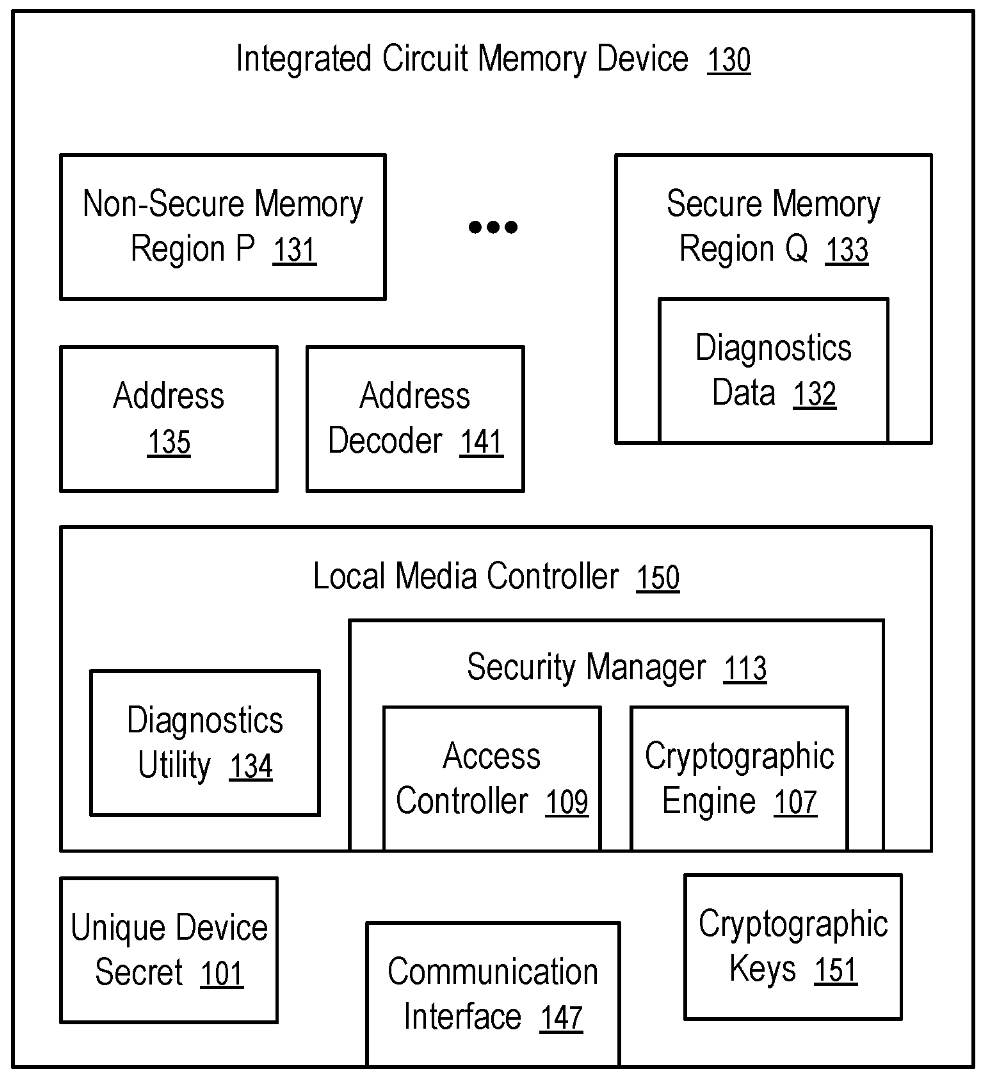
FIG. 2 illustrates an integrated circuit memory device having a security manager according to one embodiment.

FIG. 2 illustrates an integrated circuit memory device 130 having a security manager according to one embodiment. For example, the memory device 130 in the system of FIG. 1 can be implemented using the memory device 130 of FIG. 2.

The integrated circuit memory device 130 has a diagnostics utility 134 that can generate and/or store diagnostics data 132 in a secure memory region 133. Access to the secure memory region 133 is controlled by an access controller 109 based on cryptography.

For example, the diagnostics data 132 can include health and status information about memory cells 103 in the memory device 130, including the non-secure memory region 131 and/or the secure memory region 133. When the local media controller 150 operates the memory cells of the memory device 130, the diagnostics utility 134 can record the diagnostics data 132, such as statistics of operating conditions of memory cells, statistics of types of operations performed on the memory cells, statistics of correctable and/or uncorrectable errors encountered during the operations on the memory cells, error logs, etc.

The diagnostics utility 134 can be implemented via a logic circuit in the local media controller 150 and/or instructions executed by the controller 150. Optionally, the diagnostics utility 134 can be implemented at least in part via a memory sub-system controller 115 in a memory sub-system 110 (e.g., in FIG. 6) in which the memory device 130 is configured as a component. In some implementations, the diagnostics utility 134 can be implemented at least in part via instructions executed in the processing device 118 of a host system 120 in an endpoint 108 (e.g., in FIG. 1). Thus, the diagnostics data 132 can include usage, health and status information of components of the memory sub-system 110 other than the memory device 130.

The diagnostics data 132 is stored in the secure memory region 133. A command to read the data from the secure memory region 133 is required to be signed using a cryptographic key that represents the privilege to access the secure memory region 133. Thus, the diagnostics data 132 is accessible to entities having access to use the cryptographic key to sign the read commands but not others. Optionally, the diagnostics data 132 can be stored in the secure memory region 133 in an encrypted format for improved security.

The integrated circuit memory device 130 can be enclosed in a single integrated circuit package. The integrated circuit memory device 130 includes multiple memory regions 131, . . . , 133 that can be formed in one or more integrated circuit dies.

A memory region (e.g., 131 or 133) can be allocated for use by the host system as a partition or a namespace. Memory locations in the memory region (e.g., 131 or 133) can be specified by the host system via an address of Logical Block Addressing (LBA); and the memory device 130 can include an address map that specifies the relation between LBA addresses in a partition or namespace and physical addresses of corresponding memory cells used to provide the storage space allocated to the partition or namespace. In some implementations, the memory device 130 is configured in a memory sub-system 110 (e.g., in FIG. 6); and a memory sub-system controller 115 can be configured to perform the address mapping for the memory device 130.

A typical memory cell in a memory region (e.g., 131, . . . , 133) can be programmed to store one or more bits of data.

The memory device 130 has a local media controller 150, which can implement at least a portion of a security manager 113.

The security manager 113 of the memory device 130 can include an access controller 109 and a cryptographic engine 107.

The cryptographic engine 107 can be implemented via a logic circuit and/or instructions or microcode to perform cryptographic calculations, such as applying a cryptographic hash function to a data item to generate a hash value, encrypting a data item to generate cipher text using a cryptographic key, decrypting cipher text to recover a data item using a corresponding cryptographic key, generating a cryptographic key of symmetric cryptography and/or a pair of cryptographic keys of asymmetric cryptography, etc.

The access controller 109 controls access to at least one of the memory regions 131, . . . , 133 and/or other functions of the memory device 130 based on cryptographic keys that are representative of access privileges.

For example, the security manager 113 can control access to a secure memory region 133 based on a cryptographic key that is generated based on a secret 101 of the integrated circuit memory device 130 and/or a cryptographic key representative of an owner or an authorized user of the memory device 130. For example, when a request or command to write data into the secure memory region 133 is received in the integrated circuit memory device 130, the security manager 113 verifies whether the request is from a requester having the cryptographic key. If no, the security manager 113 may reject the write request. To demonstrate that the request is from an authorized requester, the requester can digitally sign the request, or a challenge message, using the cryptographic key. When the security memory device 130 determines that the digital signature is made using the correct cryptographic key, the requester is seen to have the permission to write the data into the secure memory region 133. For example, the memory device 130 can store a cryptographic key 151 that is used to authenticate the digital signature of the signed request/command.

The memory device 130 can be configured to use different cryptographic keys 151 to access control different commands. For example, one cryptographic key 151 can be representative of the privilege to have a security command executed in the memory device 130; and the security command is used to specify that another cryptographic key 151 is representative of the privilege to read and/or write in a secure memory region 133. For example, the memory device 130 can have multiple secure memory regions (e.g., 133); and access to each of the secure memory regions (e.g., 133) can be controlled via a separate cryptographic key 151.

For example, the memory device 130 can have a unique device secret 101 that represents an identity of the memory device 130; and a cryptographic key 151 derived from the unique device secret 101 can be representative of an owner privilege to operate the memory device 130 and thus have security commands executed in the memory device.

In general, the secure memory region 133 can have different security requirements for different types of accesses (e.g., read, write, erase). For example, the secure memory region 133 can be configured to require digital signatures verifiable via the cryptographic key 151 to write or change data in the secure memory region 133 but does not require a signed command to read the data from the secure memory region 133. Alternatively, the secure memory region 133 can be configured to require digital signatures verifiable via the cryptographic key 151 to read, write, and/or change data in the secure memory region 133. Alternatively, the secure memory region 133 can be configured to require digital signatures verifiable via different cryptographic keys for different operations, such as read, write, change, erase, etc., in the secure memory region 133.

The integrated circuit memory device 130 has a communication interface 147 to receive a command having an address 135. In response to the address 135 identifying a secure memory region (e.g., 133) that is configured with access control, the security manager 113 uses the cryptographic engine 107 to perform cryptographic operations for the verification that the request is from a requester having the cryptographic key authorized for the access to the memory region 133, before providing memory data retrieved from the memory region 133 using an address decoder 141. The address decoder 141 of the integrated circuit memory device 130 converts the address 135 into control signals to select a group of memory cells in the integrated circuit memory device 130; and the local media controller 150 of the integrated circuit memory device 130 performs operations to determine the memory data stored in the memory cells at the address 135.

Figure 3:
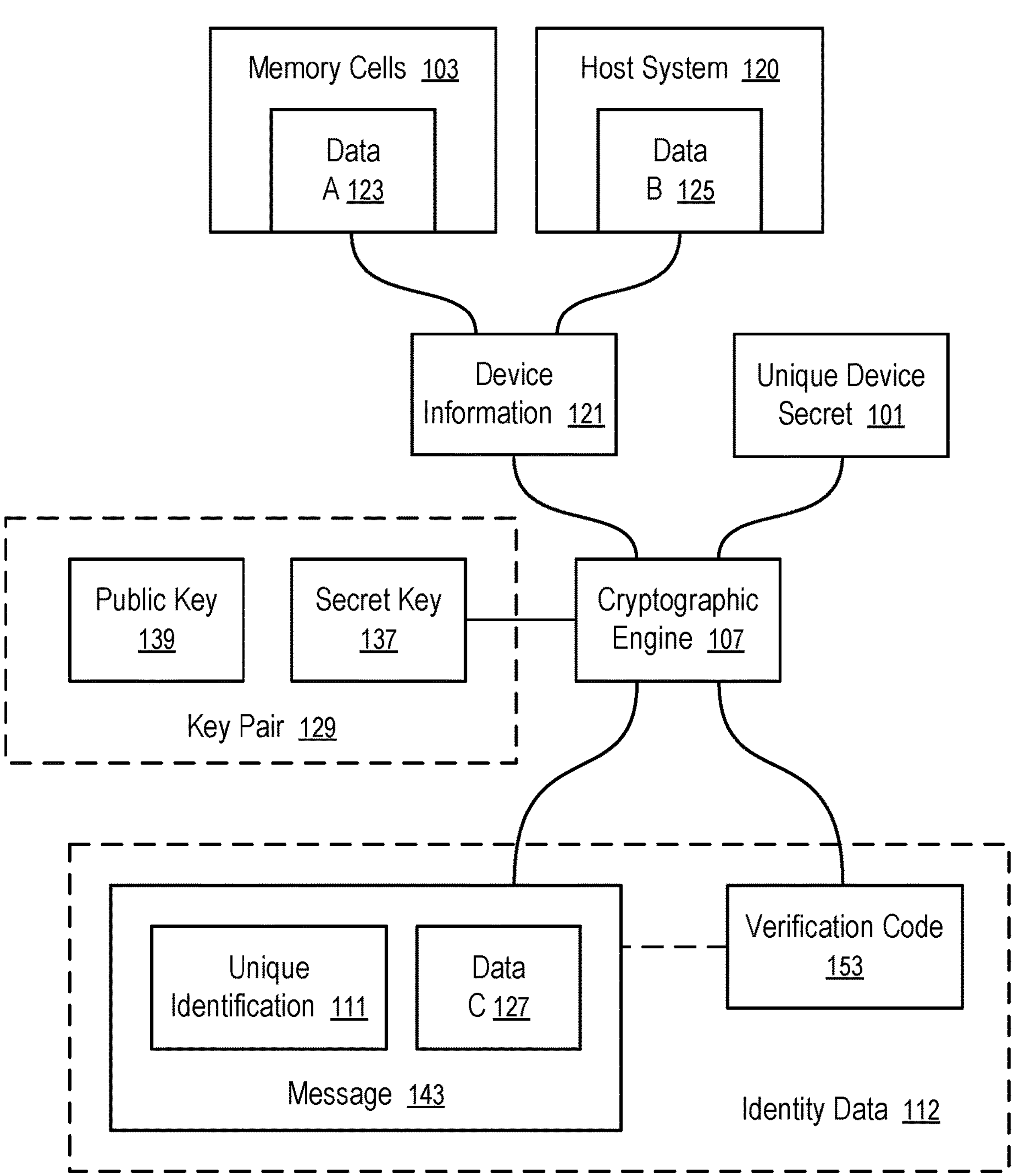
FIG. 3 illustrates the generation of identity data in an integrated circuit memory device according to one embodiment.

FIG. 3 illustrates the generation of identity data in an integrated circuit memory device according to one embodiment. For example, the technique of FIG. 3 can be implemented in the memory device 130 of FIG. 2.

In FIG. 3, the cryptographic engine 107 of a memory device 130 (e.g., as in FIG. 2) is used to generate at least a secret key 137 using its unique device secret 101 and device information 121.

For example, when asymmetric cryptography is used, the secret key 137 is a private key of a cryptographic key pair 129. An associated public key 139 is generated together with the private key using the cryptographic engine 107.

Alternatively, when symmetric cryptography is used, the secret key 137 can be generated and used without a public key 139 and without the key pair 129.

In some implementations, multiple key pairs 129 are generated and used. For example, when a method of Device Identity Composition Engine (DICE) and Robust Internet-of-Things (RIoT) is used, a first pair of asymmetric keys is referred to as device identification keys; and a second pair of asymmetric keys is referred to as alias keys. The private device identification key can be used to certify the authenticity of the alias keys and then immediately deleted and purged from the memory device 130 and to safeguard its secrecy, especially when the generation or use of the private device identification key occurs at least in part in the host system 120. The alias keys can be used in authentication in further transactions and/or communications. For example, the private device identification key can be generated at a boot time and used to sign certificates, such as a certificate of the alias public key, and then deleted. After the identity of the memory device 130 and the authenticity of the public alias key are validated or confirmed using the certificates signed using the private device identification key as the secret key 137, the private alias key can then be used as the secret key 137 of the memory device 130 in subsequent operations, until the host system 120 reboots.

For example, the data 123 stored in the memory cells 103 for the device information 121 can include a set of instructions (e.g., software, firmware, operating system, application) to be executed by the processing device 118 of the host system 120 to which the communication interface 147 of the memory device 130 is connected.

For example, the data 123 can include a cryptographic hash value of the set of instructions. For example, a known hash value of the set of instructions can be stored in the memory cells 103; and the current hash value of the set of instructions can be computed for comparison with the known hash value. If the two hash values agree with each other, the integrity of the set of instructions is verified; and the hash value of the integrity of the set of instructions can be used as part of the device information 121 to compute the secret key 137.

Alternatively, the current hash value of the set of instructions stored in the memory cells 103 can be used directly in the calculation of the secret key 137. If the instructions have changed (e.g., due to data corruption and/or tampering or hacking), the validation of the secret key 137 by a security server will fail.

Optionally, the data 123 can include an identification of the set of instructions, such as a hash value of the source code of the instructions, a name of the software/firmware package represented by the instructions, a version number and/or a release date of the package, etc.

Optionally, the data 123 can include trace data stored into the memory cells 103 during the process of building and/or customizing the computing system having the host system 120 and the memory device 130. For example, when the memory device 130 is assembled into a component device (e.g., a memory sub-system), a piece of trace data representative of the manufacturer of the component device, the model of the component device, and/or the serial number of the component device is stored into the memory cells 103 as part of the device information 121. Subsequently, when the component device is assembled into the computing system, a piece of trace data is added into the memory cells as part of the device information 121. Further trace data can be added to the memory cells 103 as part of the device information 121 to reflect the history of the memory device 130 for the individualization of the identity of the memory device 130.

Optionally, the device information 121 can further include data 125 received from the host system 120 to which the communication interface 147 of the memory device 130 is connected.

For example, the computing system can have at least the host system 120 and the memory device 130. Some of the components in the host system 120 may be removed or replaced. At the time of booting up the host system 120, a portion of the instructions stored the memory cell 103 is executed to collect data 125 about the components that are present in the host system 120 at the boot time. Thus, the device information 121 can represent a particular configuration of software/data and hardware combination of the memory device 130 and/or the host system 120. The secret key 137 generated based on the device information 121 and the unique device secret 101 represent the identity of the memory device 130 with the particular configuration.

To demonstrate the identity of the memory device 130 and/or the host system 120, the cryptographic engine 107 generates a verification code 153 from a message 143 and the secret key 137.

The verification code 153 of the secret key 137 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation.

In general, verifying whether a sender of a message (e.g., 143) has a cryptographic key (e.g., 145) involves the validation of a verification code (e.g., 153) of the message (e.g., 143). The verification code can be in the form of a hash digest, a digital signature, a Hash-based Message Authentication Code (HMAC), a Cipher-based Message Authentication Code (CMAC), etc. The verification code is generated using the cryptographic key and the message as an input to cryptographic operations such as hashing, encrypting, and/or other computations such that it is generally impractical to generate the verification code without the cryptographic key and to generate the verification code from modified version of the message. Thus, when the recipient confirms that the received verification code is valid for the received message and a cryptographic key, the recipient can conclude that the sender has the corresponding cryptographic key and the received message is the same as the message used to generate the received cryptographic key.

In some implementations, the recipient performs the validation of a verification code of a message using the same cryptographic key as used by the sender to generate the verification code. For example, the recipient uses the same cryptographic key to generate the verification code of the received message and compare the generated verification code with the received verification code. If there is a match, the received verification code is valid for the received message; and the sender can be considered to have the cryptographic key. Otherwise, the received verification code is invalid for the received message; either the received message has been changed since the generation of the verification code, or the received verification code was generated using a different cryptographic key, or both.

In some implementations, the recipient performs the validation of a verification code of a message using a public cryptographic key in a key pair; and the sender generates the verification code using a private cryptographic key in the key pair. For example, the verification code can be generated by applying a hash function to the message to generate a hash value of the message. The cipher text of the hash value obtained through encrypting the hash value performed using an encryption key can be used as the verification code. A recipient of the message and the verification code performs validation using a corresponding decryption key, which is the same as the encryption key when symmetric cryptography is used and is a different key in a key pair when asymmetric cryptography is used. After recovering a hash value from the cipher text using the decryption key, the recovered hash value can be compared to the hash value of the received message; if there is a match, the received verification code is valid for the received message; otherwise, the received verification code is invalid for the received message. Alternatively, the recipient can use the encryption key to perform the validation without performing decryption. The recipient can generate the verification code of the message using the encryption key for comparison with the received verification code.

In some implementations, a message and a cryptographic key is combined to generate a hash value as the verification code, as in a technique of Hash-based Message Authentication Code (HMAC). For example, a cryptographic key can be used to generate two keys. After combining one of the two keys with the message to generate a message modified by the key, a cryptographic hash function can be applied to the key-modified message to generate a hash value, which is further combined with the other key to generate a further message. After applying the cryptographic hash function (or another cryptographic hash function) to the further message, a hash-based message authentication code is generated. A recipient of the message can use the same cryptographic key to generate the hash-based message authentication code of the received message for comparison with the received hash-based message authentication code. If there is a match, the validation is successful; otherwise, the validation fails.

In general, any techniques for generating and validating a verification code for a message from a sender and a cryptographic key used by the sender to generate the verification code can be used to determine whether the sender has the cryptographic key. The recipient is to use an appropriate cryptographic key to perform the validation, which can be the same as the cryptographic key used to generate the verification code, or in the same pair of asymmetric cryptographic key. Thus, the present disclosure is not limited to a particular technique of hash digest, digital signature, and/or hash-bashed message authentication code.

For convenience, a verification code (e.g., 153) generated for a message (e.g., 143) using a cryptographic key (e.g., 145) to represent both the message (e.g., 143) and the cryptographic key (e.g., 145) can be referred to, generally, as a digital signature of the message (e.g., 143) signed using the cryptographic key (e.g., 145), with the understanding that the verification code can be generated using various techniques, such as hash-based message authentication code.

Optionally, the message 143 can include a user identification, such as a name, an email address, a registered username, or another identifier of an owner or authorized user of the host system 120 in which the identity data 112 is generated.

Optionally, part of the message 143 can provide information in an encrypted form. For example, the information can be encrypted using a public key of the security server such that the information is not accessible to a third party.

The message 143 can be a certificate presenting the unique identification 111 of the memory device 130 and/or the host system 120. The message 143 can further present other data 127, such as a counter value maintained in the memory device 130, a cryptographic nonce, and/or other information related to the validation of the identity data 112. The memory device 130 can monotonically increase the counter value to invalidate identity data that have lower counter values to prevent replay attacks.

In some implementations, the data 127 can include part of the device information 121 used to generate the secret key 137.

In some implementations, the secret key 137 is a private alias key in a pair of asymmetric keys. The data 127 includes a certificate presenting the corresponding public alias key in the pair of asymmetric keys. The certificate presenting the public alias key is signed using a device identification key of the memory device 130. The public alias key can be used to validate the verification code 153 for the message 143 and the private alias key that is used as the secret key 137. Once the security server validates the certificate presenting the public alias key, signed using the device identification key of the memory device 130 and provided as part of the data 127, the security server can use the public alias key to validate the verification code 153 signed using the private alias key as the secret key 137. In such an implementation, the security server can use the public alias key provided in the message 143 to validate the verification code 153 without having to regenerate the pair of alias keys; and the memory device 130 can generate the alias key pair 129 using data not known to the security server.

The certificate presenting the public alias key can be generated and validated in a way as in FIG. 3, where the secret key 137 is the device identification key generated using the device information 121 and the unique device secret 101. Optionally, the memory device 130 initially provides the security server with the certificate having the public alias key. Subsequently, the memory device 130 can use the private alias key as the secret key 137 without including the public alias key in the message 143, or without including the certificate of the public alias key in the message 143.

Further, the verification of the identity of the memory device 130 can include the use of multiple secret keys and verification codes signed using the secret keys. For example, a device identification secret key can be used to initially establish the authenticity of an alias secret key and the identity of the memory device 130; and subsequently, the alias secret key can be used to validate the authenticity of the identity of the memory device 130. In general, the device identification secret key and the alias secret key can be based on asymmetric cryptography or symmetric cryptography, since the security server can generate the corresponding cryptographic keys generated by the memory device 130.

For improved security, the memory device 130 does not use the processing power outside of the memory device 130 to generate its copy of the secret key 137 and does not communicate the secret key 137 outside of the memory device 130. The generation and use of the secret key 137 are performed using the logic circuit of the cryptographic engine 107 sealed within the memory device 130.

Alternatively, part of operations to generate and use the secret key 137 can be implemented via a set of instructions stored in the memory cells 103 and loaded into the processing device 118 of the host system 120 for execution. For improved security, the secret key 137 is not communicated across the communication interface 147 in clear text; and the instructions can be configured to purge the secret key 137 from the host system 120 after the generation and/or after the use.

The identity data 112 can be generated in response to the memory device 130 being powered up, in response to a request received in the communication interface 147, and/or in response to the host system 120 boots up (e.g., by executing a boot-loader stored in the memory cells 103). The data 127 can include a count value maintained in the memory device 130. The count value increases when the operation to generate the identity data 112 is performed. Thus, a version of the identity data 112 having a count value invalidates prior versions of the identity data 112 having count values lower than the count value.

Figure 4:
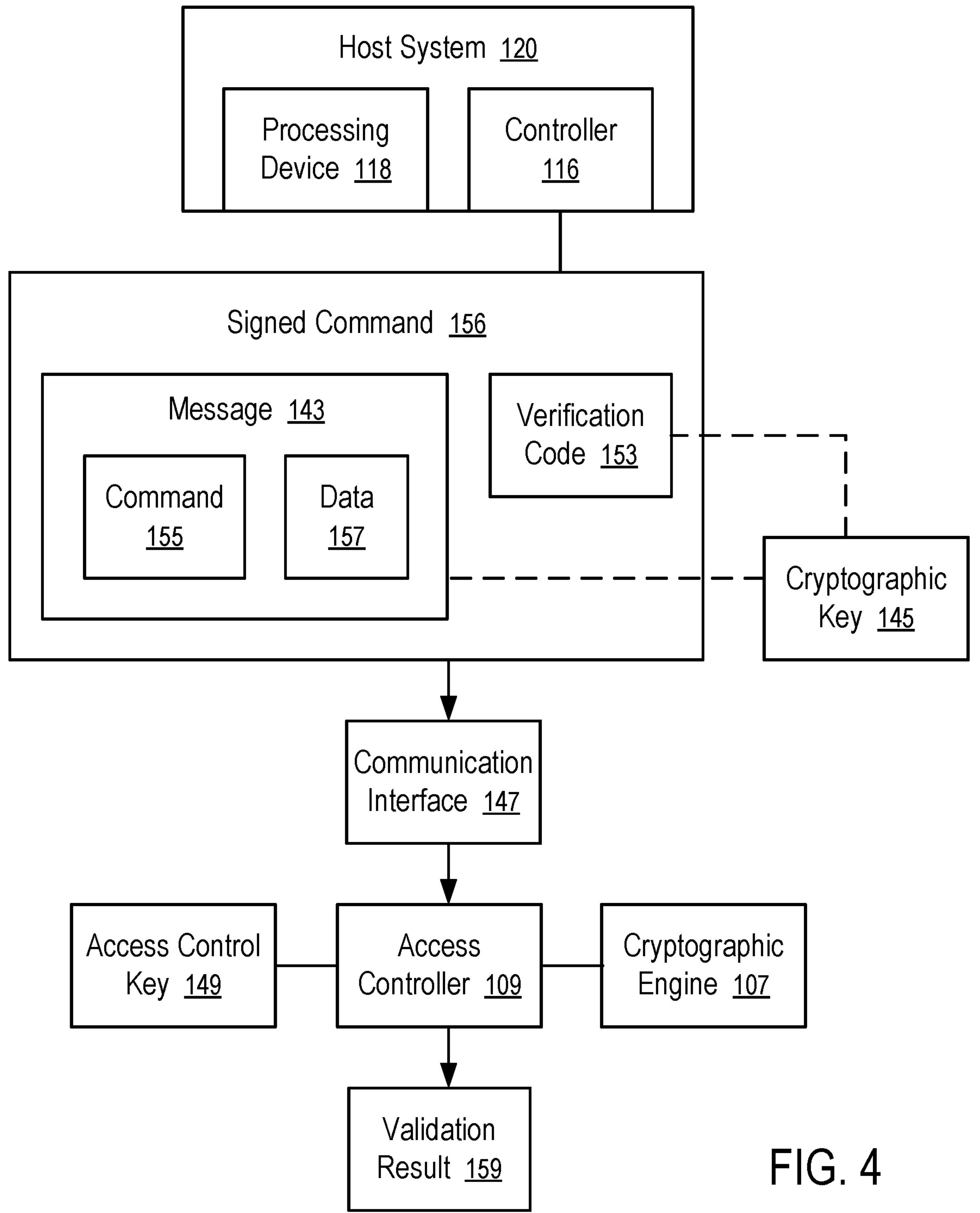
FIG. 4 illustrates a technique to control execution of a command in a memory device according to one embodiment.

FIG. 4 illustrates a technique to control execution of a command in a memory device according to one embodiment. For example, the technique of FIG. 4 can be implemented in the memory device 130 of FIG. 2.

In FIG. 4, the access controller 109 is configured with an access control key 149 to determine whether a signed command 156 received in the communication interface 147 is from an entity having the privilege to have the command 155 executed in the secure memory device 130.

When a controller 116 of a host system 120 sends a command 155 to the communication interface 147 of the memory device 130, the access controller 109 determines whether the sender of the command 155 has the privilege to request the memory device 130 to execute the command 155. The host system 120 can include one or more processing devices 118 that execute instructions implementing an operating system and/or application programs.

A cryptographic key 145 is configured to represent the privilege that is to be checked using the access control key 149. A sender of the command 155 can generate a verification code 153 from the cryptographic key 145 and a message 143 containing the command 155.

Similar to the verification code 153 discussed above in connection with FIG. 3, the verification code 153 of the cryptographic key 145 and the message 143 can be constructed and/or validated using various techniques, such as hash digest, a digital signature, or a hash-based message authentication code, symmetric cryptography, and/or asymmetric cryptography. Thus, the verification code 153 is not limited to a particular implementation; and the verification code 153 can be referred to, generally, as a digital signature of the message 143 signed using the cryptographic key 145, with the understanding that the verification code 153 can be generated using various techniques, such as hash-based message authentication code.

In FIG. 4, the access controller 109 uses a corresponding access control key 149 to validate the verification code 153 submitted to the communication interface 147 for the command 155. The access controller 109 uses the cryptographic engine 107 to generate a validation result 159 of the received message 143 and the received verification code 153. Based on the validation result 159, the access controller 109 can selectively allow the command 155 to be executed within the memory device 130 or block the execution of the command 155.

For example, the access control key 149 can be one of the cryptographic keys 151 stored in the memory device 130. Different access control keys can be used to control different privileges for executing different commands and/or for executing a command operating on different sections or regions of memory cells.

For example, one cryptographic key 145 can be representative of the privilege to have a security command executed in the memory device 130. When the security command is executed, an access control key 149 is installed (or uninstalled) in the memory device 130 for the validation of a verification code of another cryptographic key representative of the privilege to have a read command (or a write command) executed to access the secure memory region 133.

Optionally, the cryptographic key 145 is generated in the process of validating the identity of the memory device 130 based on the unique device secret 101 of the memory device 130; and a secret known between the memory device 130 and an owner of the memory device 130 allows the generation of a session key as the cryptographic key 145 to represent the privileges to have selected commands executed in the memory device 130 during a communication session. The communication session can have a time limit and/or be terminated via a command to the memory device 130.

In some implementations, a same session key used as the cryptographic key 145 representative of a privilege (e.g., to read or write the data in the secure memory region 133) and as the access control key 149 for the validation of verification codes (e.g., 153) generated using the cryptographic key 145.

In another implementations, a pair of cryptographic keys of asymmetric cryptography can be used for the session. The public key in the pair is used as the access control key 149; and the private key in the pair can be used as the cryptographic key 145 representative of the corresponding privilege.

After the installation in the memory device 130 the access control key 149 for the validation of the verification codes (e.g., 153) generated using the cryptographic key 145 representative of the privilege to read or write in the secure memory region 133, the cryptographic key 145 can be used by an authorized entity to generate the signed command 156. The signed command 156 can be transmitted to the communication interface 147 of the memory device 130 by the host system 120. After the access controller 109 validates the verification code 153 in the signed command 156, the access controller 109 allows the memory device 130 to execute the command 155.

The message 143 can include data 157 that represents restrictions on the request to execute the command 155.

For example, the data 157 can include an execution count value maintained within the memory device 130 such that verification codes generated for lower counts are invalidated.

For example, the data 157 can include a cryptographic nonce established for a specific instance of a request to execute the command 155 such that the verification code 153 cannot be reused for another instance.

For example, the data 157 can include a time window in which the verification code 153 is valid.

For example, the data 157 can include the identification of a memory region in which the command 155 is allowed to be executed.

For example, the data 157 can include a type of operations that is allowed for the execution of the command 155 in the memory device 130.

FIG. 5 shows a method to secure collection of memory diagnostics data according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 can be implemented in a system of FIG. 1 and performed at least in part by the processing device 118 or controller 116 of the host system 120, the controller 115 and/or the controller 150 of a memory sub-system 110 of FIG. 6, or processing logic in the memory device 130 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, during operations of memory cells 103 configured in a memory device 130 connected to a host system 120, diagnostics data 132 about the memory cells 103 is generated.

For example, the diagnostics data 132 can include statistics on thermal usage conditions of the memory cells, statistics on power supply to the memory cells, statistics on data access modes of the memory cells, statistics on data access types of the memory cells, statistics on data access parameters of the memory cells, or a log of errors encountered during operating (e.g., reading) the memory cells, or any combination thereof. The diagnostics data includes no user data received from the host system 120.

At block 303, the memory device 130 stores the diagnostics data 132 in a secure memory region 133 within the memory device 130 connected to the host system.

At block 305, the memory device 130 controls, based on cryptography, access to the secure memory region.

For example, a portion of the memory cells 103 can be allocated as the secure memory region 133 (e.g., a partition or a namespace). An access controller 109 in the memory device 130 checks and validates the verification code (e.g., digital signature) of a command to read the secure memory region 133 before allowing the read command to be executed in the memory device 130.

At block 307, a communication connection is established, via the host system 120, between the memory device 130 and a security server 104 having a privilege to access the secure memory region 133.

At block 309, the diagnostics data 132 is communicated from the memory device 130 to the security server 104 in an encrypted form over the communication connection.

For example, the communication connection is a secure, authenticated connection. The memory device 130 and the security server 104 authenticate each other based on cryptographic keys to establish the connection. A session key can be established for encrypting the communications over the secure, authenticated connection. Alternatively, a public key of the security server 104 can be used to encrypt the diagnostics data 132 to generate a cipher text for transmission to the security server 104.

For example, the authentication can be based on a unique device secret 101 of the memory device 130. The unique device secret is registered into a key management server of the security server 104 during manufacturing of the memory device 130 and is inaccessible via an interface of the memory device 130 to the host system 120 after completion of the manufacturing of the memory device 130. For example, the security server 104 can authenticate the identity of the memory device 130 and/or the identity of the endpoint 108 having the memory device 130 using the technique of FIG. 3.

For example, the host system 120 and/or the endpoint 108 can be configured to run the diagnostics utility 134 (or a portion of it) periodically to establish the connection from the memory device 130 to the security server 104 over an insecure computer network (e.g., the Internet). After the user of the endpoint 108 provides the permission or consent for the collection of the diagnostics data 132 by the security server 104, the connection can be used to transmit the diagnostics data 132 from the secure memory region 133 to the security server 104.

For example, the diagnostics utility 134 can be stored in the memory device 130. Before providing the diagnostics utility 134 for execution in the host system 120, the memory device 130 can validate the current hash value of the diagnostics utility 134 (e.g., by comparing it to a pre-calculated hash value stored in the memory device 130). The validation prevents tampering and/or corruption of the diagnostics utility 134.

For example, a cryptographic key 106 generated based at least in part on the unique device secret 101 can be used to represent a privilege to access the secure memory region 133. Since the security server 104 has a copy of the unique device secret 101 of the memory device, the security server 104 can generate the cryptographic key 106 to sign the command to access the secure memory region 133 to retrieve the diagnostics data 132.

By collecting the diagnostics data 132 periodically from the memory device 130, the security server 104 can monitor the health of the memory device 130 to detect an anomaly. If an anomaly is detected, the security server 104 can transmit an alert about the anomaly to the manufacturer (e.g., via a client server 122 or 124) of the endpoint 108 that includes the host system 120 and the memory device 130.

Figure 6:
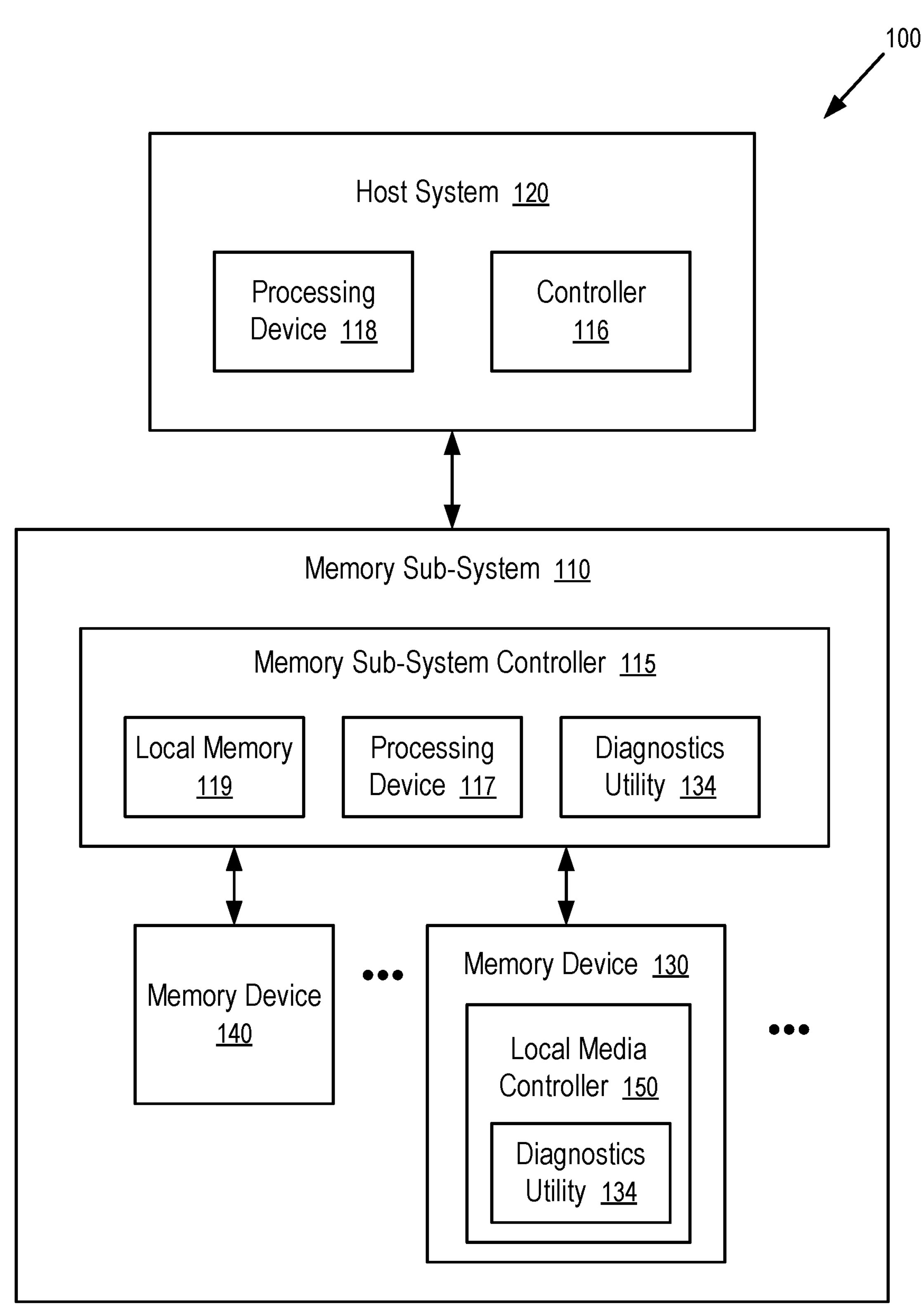
FIG. 6 illustrates an example computing system having a memory sub-system in accordance with some embodiments of the present disclosure.

FIG. 6 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 6 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 6 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 6 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 and/or a diagnostics utility 134 discussed above. In some embodiments, the controller 115 and/or the local media controller 150 in the memory sub-system 110 can include at least a portion of the security manager 113 and/or the diagnostics utility 134. In other embodiments, or in combination, the controller 116 and/or the processing device 118 in the host system 120 can include at least a portion of the security manager 113 and/or the diagnostics utility 134. For example, the controller 115, the controller 116, and/or the processing device 118 can include logic circuitry implementing the security manager 113 and/or the diagnostics utility 134. For example, the controller 115, or the processing device 118 (e.g., processor) of the host system 120, can be configured to execute instructions stored in memory for performing the operations of the security manager 113 and/or the diagnostics utility 134 described herein. In some embodiments, the security manager 113 and/or the diagnostics utility 134 can be implemented in an integrated circuit chip disposed in the memory sub-system 110. In other embodiments, the security manager 113 and/or the diagnostics utility 134 can be part of firmware of the memory sub-system 110, an operating system of the host system 120, a device driver, or an application, or any combination therein.

Figure 7:
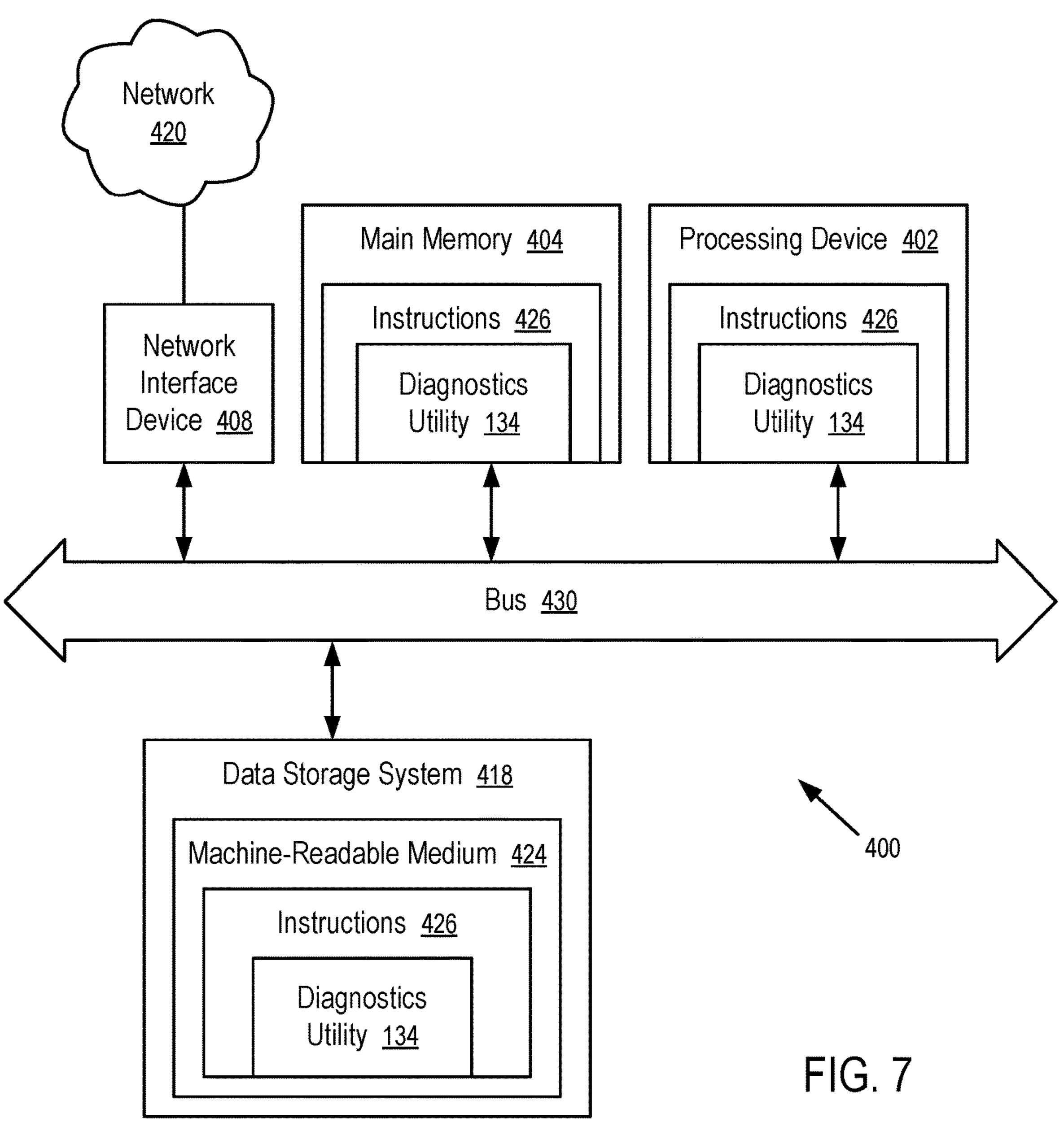
FIG. 7 is a block diagram of an example computer system in which embodiments of the present disclosure can operate.

FIG. 7 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 6) that includes, is coupled to, or utilizes a memory sub-system (e.g., the memory sub-system 110 of FIG. 6) or can be used to perform the operations of a security manager 113 and/or a diagnostics utility 134 (e.g., to execute instructions to perform operations described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 6.

In one embodiment, the instructions 426 include instructions to implement functionality corresponding to a security manager 113 and/or a diagnostics utility 134 (e.g., described with reference to FIGS. 1-6). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

generating, during operations of memory cells configured in a memory device connected to a host system, diagnostics data about the memory cells;

storing, in a secure memory region within the memory device, the diagnostics data;

controlling, by the memory device based on cryptography, access to the secure memory region, wherein access to the secure memory region is controlled by the memory device based on a type of security requirement specified for a requested type of access;

establishing, via the host system and between the memory device and a security server having a privilege to access the secure memory region based on verification of the security server satisfying the type of security requirement for the requested type of access, a communication connection;

validating, in response to a command received from the security server to read the diagnostics data, a verification code for the command generated using a cryptographic key representative of the privilege, wherein the cryptographic key is generated based on a unique device secret of the memory device that is registered into a key management server of the security server during manufacturing of the memory device and is inaccessible via an interface of the memory device to the host system after completion of the manufacturing of the memory device; and communicating, over the communication connection and based on validation of the verification code, the diagnostics data from the memory device to the security server in an encrypted form, wherein the encrypted form is generated by utilizing a session key established during at least one authentication operation that authenticates an identity of the memory device based on the unique device secret to establish the communication connection between the memory device and the security server.

2. The method of claim 1, wherein the privilege is based on the unique device secret of the memory device registered with the security server during manufacturing of the memory device.

3. The method of claim 2, further comprising:

monitoring health of the memory device based on the diagnostics data to detect an anomaly; and transmitting an alert to a manufacturer of an endpoint having the host system and the memory device in response to the anomaly.

4. The method of claim 3, further comprising:

running a diagnostics utility in the host system to establish the communication connection over an insecure computer network periodically.

5. The method of claim 4, wherein the privilege is represented by the cryptographic key used to sign the command to read the secure memory region; and the cryptographic key is generated based at least in part on the unique device secret.

6. The method of claim 5, further comprising:

generating a cipher text of the diagnostics data using the cryptographic key derived at least in part from the unique device secret to communicate the diagnostics data from the memory device to the security server in the encrypted form.

7. The method of claim 6, wherein the diagnostics data includes statistics on thermal usage conditions of the memory cells, statistics on a power supply to the memory cells, statistics on data access modes of the memory cells, statistics on data access types of the memory cells, statistics on data access parameters of the memory cells, or an error log of reading the memory cells, or any combination thereof.

8. The method of claim 7, wherein the diagnostics data includes no user data received from the host system.

9. The method of claim 7, further comprising:

receiving in the diagnostics utility a user input representative of a consent from a user of the endpoint to transmit the diagnostics data to the security server.

10. A memory device, comprising:

memory cells formed on one or more integrated circuit dies;

a logic circuit implementing a cryptographic engine and an access controller; and a first communication interface connectable to a host system;

wherein a portion of the memory cells is allocated as a secure memory region;

wherein the access controller is configured to control access to the secure memory region based on cryptography wherein access to the secure memory region is controlled by the access controller based on a type of security requirement specified for a requested type of access;

wherein during operations of the memory cells servicing the host system, the logic circuit is configured to generate diagnostics data about the memory cells and store the diagnostics data in the secure memory region;

wherein, in response to a command received from a security server to read the diagnostics data, the memory device is configured to validate a verification code for the command generated using a cryptographic key representative of a privilege to access the secure memory region, wherein the cryptographic key is generated based on a unique device secret of the memory device that is registered into a key management server of the security server during manufacturing of the memory device that is inaccessible via a second communication interface of the memory device to the host system after completion of the manufacturing of the memory device; and wherein when a communication connection is established, via the host system and between the memory device and the security server having the privilege to access the secure memory region based on verification of the security server satisfying the type of security requirement for the requested type of access, the memory device, after validation of the verification code, is configured to communicate the diagnostics data over the communication connection to the security server in an encrypted form, wherein the encrypted form is generated by utilizing a session key established during at least one authentication operation that authenticates an identity of the memory device based on the unique device secret to establish the communication connection between the memory device and the security server.

11. The memory device of claim 10, wherein the diagnostics data includes statistics on thermal usage conditions of the memory cells, statistics on a power supply to the memory cells, statistics on data access modes of the memory cells, statistics on data access types of the memory cells, statistics on data access parameters of the memory cells, or a log of errors in operating the memory cells, or any combination thereof; the memory cells store a diagnostics utility having instructions executable in the host system; and the memory device is configured to validate integrity of the instructions in response to a request from the host system to retrieve the instructions for execution.

12. The memory device of claim 11, wherein the instructions, when executed in the host system, cause the host system to establish the communication connection between the memory device and the security server.

13. The memory device of claim 11, wherein the memory device is configured to transmit the diagnostics data in a cipher text generated using the cryptographic key derived at least in part from the unique device secret.

14. The memory device of claim 11, wherein the memory device is configured to transmit the diagnostics data in a cipher text generated using the session key established during the at least one authentication operation to establish the communication connection between the memory device and the security server.

15. A system, comprising:

a key management server configured to store a cryptographic key associated with a memory device, wherein the memory device is configured to store diagnostics data about memory cells in the memory device in a secure memory region in the memory device, wherein the cryptographic key is generated based on a unique device secret of the memory device that is registered into the key management server of a security server during manufacturing of the memory device; and wherein an access controller of the memory device is configured to:

receive, from the security server, a command to read the diagnostics data;

validate a verification code of the command to retrieve the diagnostics data from the secure memory region of the memory device, wherein the verification code is generated using the cryptographic key representative of a privilege of the security server to access the secure memory region, wherein the cryptographic key is generated based on the unique device secret of the memory device that is registered into the key management server during manufacturing of the memory device and that is inaccessible via an interface of the memory device to a host system after completion of the manufacturing of the memory device; and wherein, in response to the access controller of the memory device verifying the verification code, a communication connection is established between the security server and the memory device and the diagnostics data is transferred from the secure memory region to the security server via the communication connection in an encrypted form generated by utilizing a session key established during at least one authentication operation that authenticates an identity of the memory device based on the unique device secret to establish the communication connection.

16. The system of claim 15, wherein instructions are configured to cause the system to monitor the diagnostics data retrieved from the memory device to detect an anomaly and transmit an alert about the anomaly to a manufacturer of an endpoint having the host system and the memory device.

17. The system of claim 16, wherein the diagnostics data includes statistics on thermal usage conditions of the memory cells, statistics on a power supply to the memory cells, statistics on data access modes of the memory cells, statistics on data access types of the memory cells, statistics on data access parameters of the memory cells, or an error log, or any combination thereof.

* * * * *